(12) United States Patent  
Abdelhamed et al.

(10) Patent No.: US 12,488,504 B2  
(45) Date of Patent: Dec. 2, 2025

(54) APPARATUS AND METHOD FOR PERFORMING COLOR TRANSFORMATION ON RAW SENSOR IMAGES

(71) Applicant: SAMSUNG ELECTRONICS CO., LTD., Suwon-si (KR)

(72) Inventors: Abdelrahman Abdelhamed, North York (CA); Michael Scott Brown, Toronto (CA); Abhijith Punnappurath, North York (CA); Luxi Zhao, Toronto (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 477 days.

(21) Appl. No.: 18/110,032

(22) Filed: Feb. 15, 2023

(65) Prior Publication Data

US 2024/0029308 A1 Jan. 25, 2024

Related U.S. Application Data

(60) Provisional application No. 63/390,903, filed on Jul. 20, 2022.

(51) Int. Cl.
*G06T 7/90* (2017.01)

(52) U.S. Cl.
CPC ...... *G06T 7/90* (2017.01); *G06T 2207/10024* (2013.01); *G06T 2207/20081* (2013.01); *G06T 2207/20084* (2013.01)

(58) Field of Classification Search
CPC ............ G06T 7/90; G06T 2207/10024; G06T 2207/20081; G06T 2207/20084; H04N 1/6086; H04N 23/88
See application file for complete search history.

(56) References Cited

U.S. PATENT DOCUMENTS 10,163,029 B2  12/2018  Doshi
11,037,278 B2   6/2021  Zamir et al.
(Continued)

FOREIGN PATENT DOCUMENTS

KR  10-2013-0020486 A  2/2013
KR  10-2022-0056067 A  5/2022
KR  10-2022-0076952 A  6/2022

OTHER PUBLICATIONS

Mahmoud Afifi et al., "Deep White-Balance Editing", arXiv:2004. 01354v1 [cs.CV], Apr. 3, 2020, 10 pages.
(Continued)

*Primary Examiner* — Christopher Wait
(74) *Attorney, Agent, or Firm* — Sughrue Mion, PLLC

(57) ABSTRACT

A method for processing image data may include: obtaining a raw input image that is captured under an input illumination; obtaining a target illumination from a user input; obtaining an intermediate image having colors captured under a reference illumination, from the raw input image, based on a first color transform that maps the input illumination to the reference illumination in an illumination dataset of raw sensor images that are captured under a plurality of different illuminations; and obtaining an output image having colors captured under the target illumination, from the intermediate image, based on a second color transform that maps the reference illumination in the illumination dataset to the target illumination.

20 Claims, 15 Drawing Sheets

(56) References Cited

U.S. PATENT DOCUMENTS

| | | |
|---|---|---|
| 11,995,800 B2 | 5/2024 | Zhu et al. |
| 2020/0051217 A1 | 2/2020 | Shen et al. |
| 2020/0234414 A1 | 7/2020 | Zamir et al. |
| 2021/0160470 A1* | 5/2021 | Afifi .................... G06F 3/04845 |
| 2021/0216816 A1 | 7/2021 | Huang et al. |
| 2021/0264576 A1 | 8/2021 | Sun et al. |
| 2022/0044363 A1 | 2/2022 | Zhu et al. |
| 2022/0132001 A1 | 4/2022 | Dinh et al. |
| 2022/0156899 A1 | 5/2022 | Abdelhamed et al. |
| 2022/0164601 A1 | 5/2022 | Lo et al. |
| 2022/0171999 A1 | 6/2022 | Kim et al. |

OTHER PUBLICATIONS

Extended European Search Report issued Mar. 5, 2025 by the European Patent Office for EP Patent Application No. 23843126.6.
Communication dated Jul. 17, 2023, issued by the International Searching Authority in counterpart International Application No. PCT/KR2023/005243 (PCT/ISA/220, PCT/ISA/210, and PCT/ISA/237).
Abdelhamed et al., "Leveraging the Availability of Two Cameras for Illuminant Estimation," CVPR 2021 paper, pp. 6637-6646, 2021.
Cheng et al., "Beyond White: Ground Truth Colors for Color Constancy Correction," ICCV paper, pp. 298-306, 2015.
Nguyen et al., "Raw-to-raw: Mapping between image sensor color responses," CVPR 2014 paper, pp. 1-8, 2014.

* cited by examiner

APPARATUS AND METHOD FOR PERFORMING COLOR TRANSFORMATION ON RAW SENSOR IMAGES

CROSS-REFERENCE TO RELATED APPLICATION(S)

This application is based on and claims priority under 35 U.S.C. § 119 to U.S. Provisional Patent Application No. 63/390,903 filed on Jul. 20, 2022, in the U.S. Patent & Trademark Office, the disclosure of which is incorporated herein by reference in its entirety.

BACKGROUND

1. Field

The disclosure relates to an apparatus and a method for converting colors of an input sensor image that is captured under any arbitrary input illumination to colors under any arbitrary target illumination, such that an output image appears as if it had been captured under the target illumination.

2. Description of Related Art

Capturing raw sensor images under various settings is quite challenging, especially under various illuminations and lighting conditions. The process requires adjusting camera settings, using tripods, setting up the scene, and likely finding different lighting conditions and environments. With such limitations, it is effort and time consuming to capture large scale datasets of raw sensor images for training neural network models.

For example, a mobile device is updated with a new image sensor, new training datasets need to be recaptured because the new image sensor may have different characteristics (e.g., spectral sensitivity, noise profile, etc.). The time and effort needed to capture training data is a significant challenge to the manufacturer of the mobile device and other smartphone and camera companies.

Therefore, there has been a demand for a method for augmenting existing datasets of raw sensor images to obtain synthetic images with various illumination conditions. However, in previous color transformation methods, color mapping is inaccurate and could only be performed for a specific set of illuminations rather than being capable of converting images between arbitrary illuminations.

SUMMARY

One or more embodiments of the present disclosure provide an apparatus and method for converting colors of an input sensor image that is captured under any arbitrary input illumination to colors under any arbitrary target illumination such that an output image appears as if it had been captured under the target illumination.

Further, one or more embodiments of the present disclosure provide an apparatus and method for performing data augmentation for training neural networks by converting colors of an input sensor image.

Still further, one or more embodiments of the present disclosure provide an apparatus and method for providing photo editing options for converting colors of a raw input image from an arbitrary input illumination to an arbitrary target illumination.

According to an aspect of the present disclosure, an electronic device for processing image data, may include: a user interface configured to receive a target illumination; at least memory storing instructions and configured to store an illumination dataset of raw sensor images that are captured under a plurality of different illuminations including a reference illumination; and at least one processor configured to execute the instructions to: obtain a raw input image that is captured under an input illumination; obtain an intermediate image having colors captured under the reference illumination, from the raw input image, based on a first color transform that maps the input illumination to the reference illumination in the illumination dataset; and obtain an output image having colors captured under the target illumination, from the intermediate image, based on a second color transform that maps the reference illumination in the illumination dataset, to the target illumination.

The at least one processor may be further configured to perform illumination estimation on the raw input image that is transformed by the first color transform and the second color transform, via an auto-white-balance module.

The at least one processor may be further configured to create an augmented data set including the output image, and input the augmented data set to an artificial intelligence (AI)-based image processing model to train the AI-based image processing model.

The raw sensor images and the raw input image may be unprocessed Bayer images or images which are not corrected via an image signal processor (ISP).

The first color transform and the second color transform may be represented as a first transformation matrix and a second transformation matrix, respectively, wherein the at least one processor may be further configured to: obtain the first color transform via a first neural network configured to receive a ratio of RGB values of the input illumination and output elements of the first transformation matrix; and obtain the second color transform via a second neural network configured to receive a ratio of RGB values of the target illumination and output elements of the second transformation matrix.

The first neural network and the second neural network may be trained using a training input illumination, a training target illumination, and the reference illumination that are obtained from the illumination dataset, wherein the training input illumination, the training target illumination, and the reference illumination may be obtained from an achromatic patch in a color rendition chart of the raw sensor images.

The at least one processor may be further configured to: based on the illumination dataset not including the input illumination, identify a K number of illuminations that are nearest to the input illumination in the illumination dataset, and use a weighted sum of color transforms of the K number of illuminations as the first color transform, wherein K denotes a natural number that is greater than or equal to 2.

The at least one processor may be further configured to: based on the illumination dataset not including the target illumination, identify a K number of illuminations that are nearest to the target illumination in the illumination dataset, and use a weighted sum of color transforms of the K number of illuminations as the second color transform, wherein K denotes a natural number that is greater than or equal to 2.

The electronic device may further include: a camera configured to capture the raw input image; and a display, wherein the user interface is further configured to receive, as a user input, the target illumination and a request for creating a synthesized image of the raw input image, and wherein the at least one processor may be further configured to control the display to display the output image as the synthesized image of the raw input image that is re-illuminated under the target illumination.

According to another aspect of the present disclosure, a method for processing image data, may include: obtaining a raw input image that is captured under an input illumination; obtaining a target illumination from a user input; obtaining an intermediate image having colors captured under a reference illumination, from the raw input image, based on a first color transform that maps the input illumination to the reference illumination in an illumination dataset of raw sensor images that are captured under a plurality of different illuminations; and obtaining an output image having colors captured under the target illumination, from the intermediate image, based on a second color transform that maps the reference illumination in the illumination database, to the target illumination.

The method may further include performing illumination estimation on the raw input image transformed by the first color transform and the second color transform, via an auto-white-balance module.

The method may further include: creating an augmented data set including the output image, and input the augmented data set to an artificial intelligence (AI)-based image processing model to train the AI-based image processing model.

The raw input image may be an unprocessed Bayer image or an image which is not corrected via an image signal processor (ISP).

The first color transform and the second color transform may be represented as a first transformation matrix and a second transformation matrix, respectively. The method may further include: obtaining the first color transform via a first neural network configured to receive a ratio of RGB values of the input illumination and output elements of the first transformation matrix; and obtaining the second color transform via a second neural network configured to receive a ratio of RGB values of the target illumination and output elements of the second transformation matrix.

The method may further include: training the first neural network using a training input illumination and the reference illumination; and training the second neural network using the reference illumination and a training target illumination, wherein the training input illumination, the training target illumination, and the reference illumination are obtained from the illumination dataset.

The method may further include: based on the illumination dataset not including the input illumination, identifying a K number of illuminations that are nearest to the input illumination in the illumination dataset, and using a weighted sum of color transforms of the K number of illuminations as the first color transform, wherein K denotes a natural number that is greater than or equal to 2.

The method may further include: based on the illumination dataset not including the target illumination, identifying a K number of illuminations that are nearest to the target illumination in the illumination dataset, and using a weighted sum of color transforms of the K number of illuminations as the second color transform, wherein K denotes a natural number that is greater than or equal to 2.

According to another aspect of the present disclosure, there is provided a non-transitory computer-readable storage medium storing a program that is executable by at least one processor to perform the method for processing the image data.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

Figure 1:
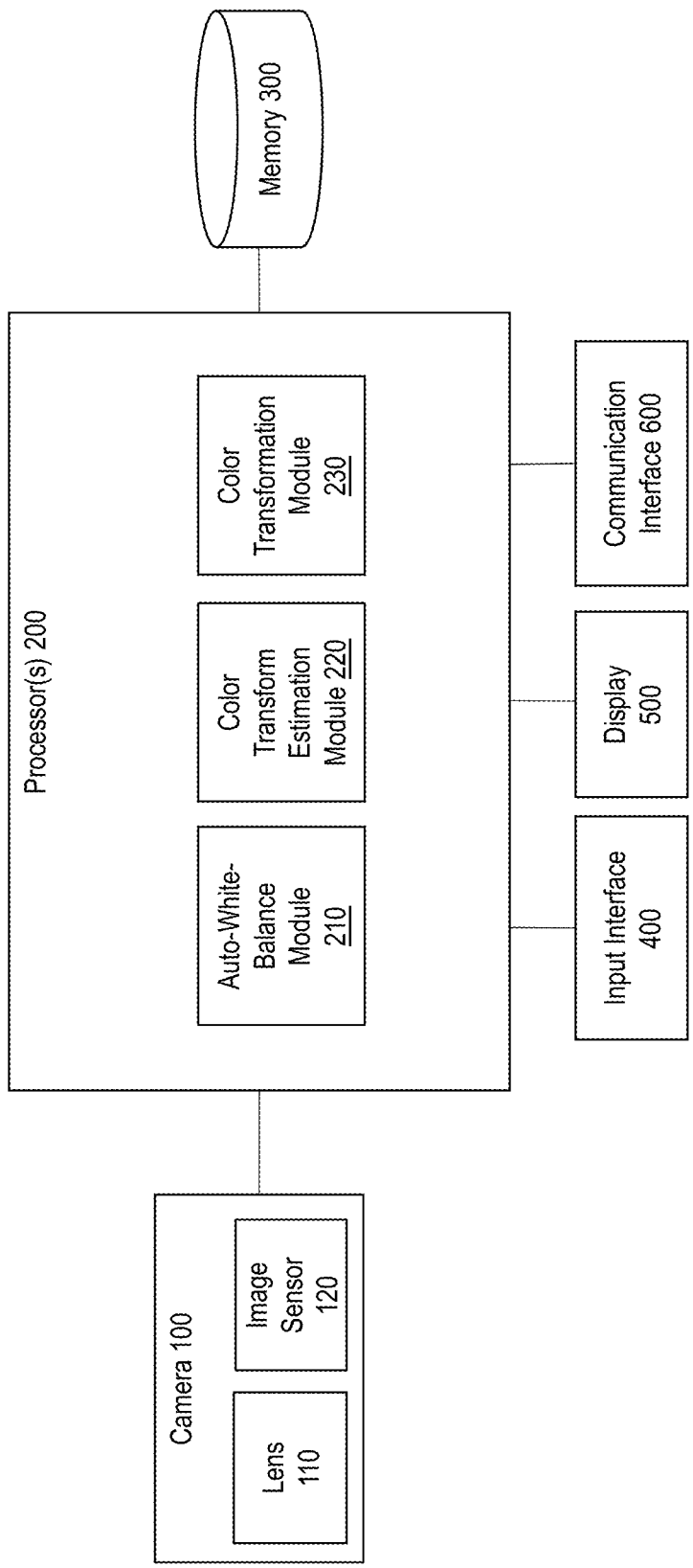
FIG. 1 is a diagram of an electronic device for performing color transformation according to embodiments of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

The term "module" or "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

One or more embodiments of the present disclosure provide performing an illumination synthesis process that includes: estimating a color transform that maps an input illumination applied to an input image to a target illumination; and applying the color transform to the input image to obtain an output image under the target illumination.

The input sensor image may be an unprocessed raw image that is output from an image sensor. The term "raw image" may refer to an unprocessed digital output of an image sensor of a camera, and may be also referred to as a "raw burst image" or "Bayer image." Light or photons incident from a scene are digitalized and recorded by a camera sensor, and the raw image is constituted with digital pixel intensity values recorded by the camera sensor before any processing is applied. For example, the raw image is an image that is not processed via an image signal processor (ISP) or an image processing unit (IPU), and may have a raw Bayer format. When the camera sensor includes sensor elements that are arranged in a pattern of red, green, and blue color channels, which is called a Bayer array, an image recorded by the Bayer array on the camera sensor is called the Bayer image.

Further, one or more embodiments of the present disclosure provide mapping colors of an input sensor image that is captured under any arbitrary illumination, to any arbitrary target illumination such that an output image appears as if it was captured under the target illumination.

Still further, one or more embodiments of the present disclosure provide an apparatus and a method for estimating a transform matrix that converts the colors of the input sensor image that is captured under an input illumination, to colors that are obtained under a target illumination.

Still further, one or more embodiments of the present disclosure provide an apparatus and a method for applying the transform matrix to originally captured images to perform a white-balance correction, or to generate synthetic images for data augmentation.

FIG. 1 is a diagram of an electronic device for performing color transformation according to embodiments of the present disclosure.

As shown in FIG. 1, the electronic device may include a camera 100, at least one processor 200, at least one memory 300, an input interface 400, a display 500, and a communication interface 600.

The camera 100 may include a lens 110, and an image sensor 120 that may include a complementary metal oxide semiconductor (CMOS) sensor or a charge-coupled device (CCD) sensor, and a color filter array (CFA). The camera 100 may capture an image based on a user input that is received via the input interface 400, and may output an unprocessed raw image to the processor 200. The input interface 400 may be implemented as at least one of a touch panel, a keyboard, a mouse, a button, a microphone, and the like.

The processor 200 may include an artificial intelligence (AI)-based image processing model that includes an auto-white-balance module 210, a color transform estimation module 220, and a color transformation module 230. While the auto-white-balance module 210 is illustrated as being provided outside the camera 100, the auto-white-balance module 210 may be provided inside the camera 100 depending on embodiments. The processor 200 may receive an input image from the camera 100, or from an external device via the communication interface 600. The input image may be a raw image that is not processed by an image signal processor (ISP), and/or which has a Bayer format.

Based on a user input for editing the input image, for example, a user input requesting color transformation to convert the input image from an input illumination to a target illumination, the processor 200 may perform color transformation on the input image, and output the color-transformed input image as a processed image. The processor 200 may output the processed image via the display 500, and may store the processed image in the memory 300 as an augmented image or a synthesized image.

In embodiments of the disclosure, the processor 200 may estimate a color transform that maps an input illumination of an input image to any arbitrary target illumination, and may apply the color transform to the input image to obtain an output image under the target illumination.

In detail, referring to the processor 200, the auto-white-balance module 210 may identify an input illumination under which the input image is captured, and the color transform estimation module 220 may estimate a first color transform that maps the input illumination to a reference illumination (e.g., a daylight illumination), and a second color transform that maps the reference illumination to a target illumination.

The color transform estimation module 220 may estimate a color transform using a linear mapping method (e.g., y=ax+b where saturated pixels are excluded during estimation of the color transform), a non-linear mapping method (e.g., a second degree polynomial having a form of $ax^2+bx+c$ or higher order functions), or a neural network.

In an embodiment, either one or both of a first color transform and a second color transform may be estimated using a linear mapping method. For example, a color transform T (e.g., the first color transform or the second color transform) between a first illumination $L_1[r_1, g_1, b_1]$ and a second illumination $L_2[r_2, g_2, b_2]$ may be obtained as follows:

$$\begin{bmatrix} r2/r1 & 0 & 0 \\ 0 & g2/g1 & 0 \\ 0 & 0 & b2/b1 \end{bmatrix}$$

For example, for the first color transform, the first illumination $L_1[r_1, g_1, b_1]$ and the second illumination $L_2[r_2, g_2, b_2]$ may correspond to an illumination of an input image and a reference illumination, respectively. For the second color transform, the first illumination $L_1[r_1, g_1, b_1]$ and the second illumination $L_2[r_2, g_2, b_2]$ may correspond to the reference illumination and a target illumination, respectively.

More specifically, given a first image $I_1 \in R^{N \times 3}$ under the first illumination $L_1 \in R^3$, and a second image $I_2 \in R^{N \times 3}$ under the second illumination $L_2 \in R^3$ with n pixels of the same scene, a linear color transform $T \in R^{3 \times 3}$ between the color values of the first image $I_1$ and the second image $I_2$ may be expressed as $I_2 \approx I_1 T$. T may be computed using a pseudo inverse as follows: $T=(I_1^T I_1)^{-1} I_1^T I_2$.

For example, the linear color transform T may be represented in a 3×3 color transform matrix as follows:

$$T_{3 \times 3} = \begin{pmatrix} t_1 & t_2 & t_3 \\ t_4 & t_5 & t_6 \\ t_7 & t_8 & t_9 \end{pmatrix}$$

More specifically, given A denotes pixel values in R, G, B color channels for the first image $I_1$, B denotes pixel values in R, G, B color channels for the second image $I_2$, the 3×3 color transform matrix T between A and B is calculated as follows.

$$A \times T = B$$

$$A = \begin{bmatrix} a_{1R} & a_{1G} & a_{1B} \\ a_{2R} & a_{2G} & a_{2B} \\ \ldots & \ldots & \ldots \\ a_{NR} & a_{NG} & a_{NB} \end{bmatrix}$$

$$T = \begin{bmatrix} t_1 & t_2 & t_3 \\ t_4 & t_5 & t_6 \\ t_7 & t_8 & t_9 \end{bmatrix}$$

$$B = \begin{bmatrix} b_{1R} & b_{1G} & b_{1B} \\ b_{2R} & b_{2G} & b_{2B} \\ \ldots & \ldots & \ldots \\ b_{NR} & b_{NG} & b_{NB} \end{bmatrix}$$

In the matrices of A and B, the three columns correspond to R, G, B color channels, and the rows correspond to the number of pixels in the input image $I_1$ and the output image $I_2$, respectively.

Using a pseudo-inverse equation, the 3×3 color transform matrix T is calculated as follows:

$$T = \left( \begin{bmatrix} a_{1R} & a_{1G} & a_{1B} \\ a_{2R} & a_{2G} & a_{2B} \\ \ldots & \ldots & \ldots \\ a_{NR} & a_{NG} & a_{NB} \end{bmatrix}^T \begin{bmatrix} a_{1R} & a_{1G} & a_{1B} \\ a_{2R} & a_{2G} & a_{2B} \\ \ldots & \ldots & \ldots \\ a_{NR} & a_{NG} & a_{NB} \end{bmatrix} \right)^{-1} \begin{bmatrix} a_{1R} & a_{1G} & a_{1B} \\ a_{2R} & a_{2G} & a_{2B} \\ \ldots & \ldots & \ldots \\ a_{NR} & a_{NG} & a_{NB} \end{bmatrix}^T$$

$$\begin{bmatrix} b_{1R} & b_{1G} & b_{1B} \\ b_{2R} & b_{2G} & b_{2B} \\ \ldots & \ldots & \ldots \\ b_{NR} & b_{NG} & b_{NB} \end{bmatrix}$$

In the embodiment, the 3×3 color transform matrix is used since the 3×3 color transform matrix is linear and accurate, and computationally efficient. However, the size of the color transform matrix is not limited thereto, and any 3×M color transform matrix (wherein 3) may be used.

In another embodiment of the present disclosure, the color transform T may be estimated using a neural network that is trained to estimate a color transform. In particular, machine learning-based methods may be used to predict the color transforms that map between the input illumination and the reference illumination, and between the reference illumination and the target illumination. In estimating the color transforms, a small dataset of images of color charts captured under various illuminations may be used without requiring a large training dataset. A method of estimating the color transform T using a neural network which will be described later with reference to FIGS. 5, 6A, and 6B in detail.

The color transformation module 230 may apply the first color transform to an input image to obtain an intermediate image, and may apply the second color transform to the intermediate image to obtain an output image. The processor 200 is capable of mapping an image from any arbitrary input illumination to any arbitrary target illumination, via the two-step color transformation method using the reference illumination (e.g., the daylight illumination) as a proxy. Using the daylight illumination as a middle proxy may lead to accurate results due to the fact that the daylight illumination has a wide spectral distribution and under which most colors are well represented.

Additionally, the auto-white-balance module 210 may perform illumination estimation on an input image transformed by the first color transform and the second color transform.

The color-transformed input image may be stored in the memory 300 as an augmented image.

All the elements of the electronic device may be included in a single device, or may be included in more than one device. For example, the camera 100, the input interface 400, and the display 500 may be included in a client device (e.g., a smartphone), and the AI-based image processing model of the processor 200 may be included in a server. When the AI-based image processing model is included in the server, the client device may send an input image and a target illumination to the server, request the server to perform color transformation on the input image according to the target illumination to obtain a processed image, and may receive the processed image from the server.

Figure 2:
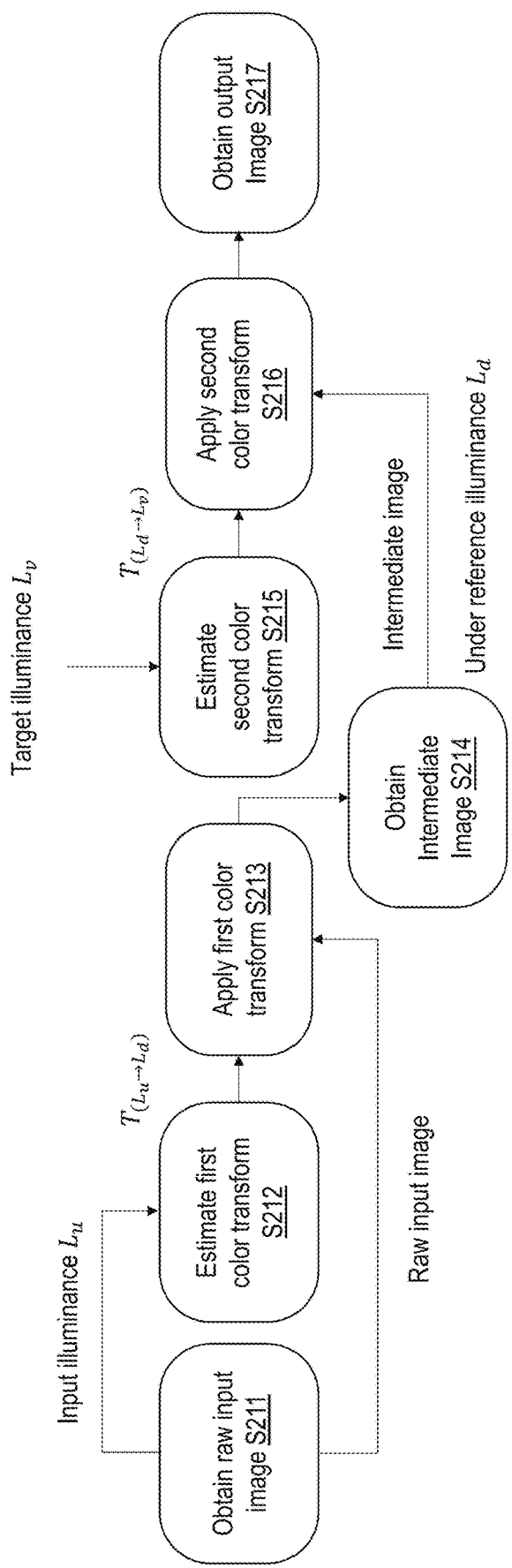
FIG. 2 illustrates a color transformation method according to embodiments of the present disclosure.

FIG. 2 illustrates a color transformation method according to embodiments of the present disclosure.

According to an embodiment, a method of estimating a color transform that maps an input image from an input illumination to a target illumination, includes estimating a color transform that maps the input illumination to a reference illumination (e.g., daylight illumination), and then another color transform that maps the reference illumination to the target illumination, using the reference illumination as a middle proxy to improve the estimation accuracy of the color transform and to reduce a computational load.

In detail, as shown in FIG. 2, the color transformation method may include operation S211 of obtaining an input image captured under an input illumination, operation 212 of estimating a first color transform that converts an illumination condition of the input image from the input illumination into a reference illumination, operation S213 of applying the first color transform to the input image, operation S241 of obtaining the color-transformed input image as an intermediate image, operation S215 of estimating a second color transform that converts an illumination condition of the intermediate image into a target illumination, operation 216 of applying the second color transform to the intermediate image, and operation S217 of obtaining the color-transformed intermediate image as an output image.

In operation S211, the input image may be a raw sensor image that is output from the image sensor 120, without being processed via an image signal processor (ISP).

In operation S212, the input illumination of the input image may be identified by an auto-white-balance (AWB) module that is included in the camera 100 or the at least one processor 200. The first color transform may be estimated using a linear or non-linear color transform estimation method, or a first neural network that is trained to receive, as input, the input illumination, and output the first color transform that converts the input image from the input illumination into the reference illumination. A method of training the first neural network will be described later with reference to FIGS. 3-5.

In operations S213 and S214, the first color transform is applied to the input image to re-illuminate the input image under the reference illumination to obtain the intermediate image under the reference illumination.

In operation S215, the second color transform may be estimated using a linear or non-linear color transform estimation method, or a second neural network that is trained to receive, as input, the target illumination, and output the second color transform that converts the intermediate image from the reference illumination to the target illumination. A method of training the second neural network will be described later with reference to FIGS. 3-5.

In operations S216 and S217, the second color transform is applied to the intermediate image to re-illuminate the intermediate image under the target illumination to obtain the output image under the target illumination.

Figure 3:
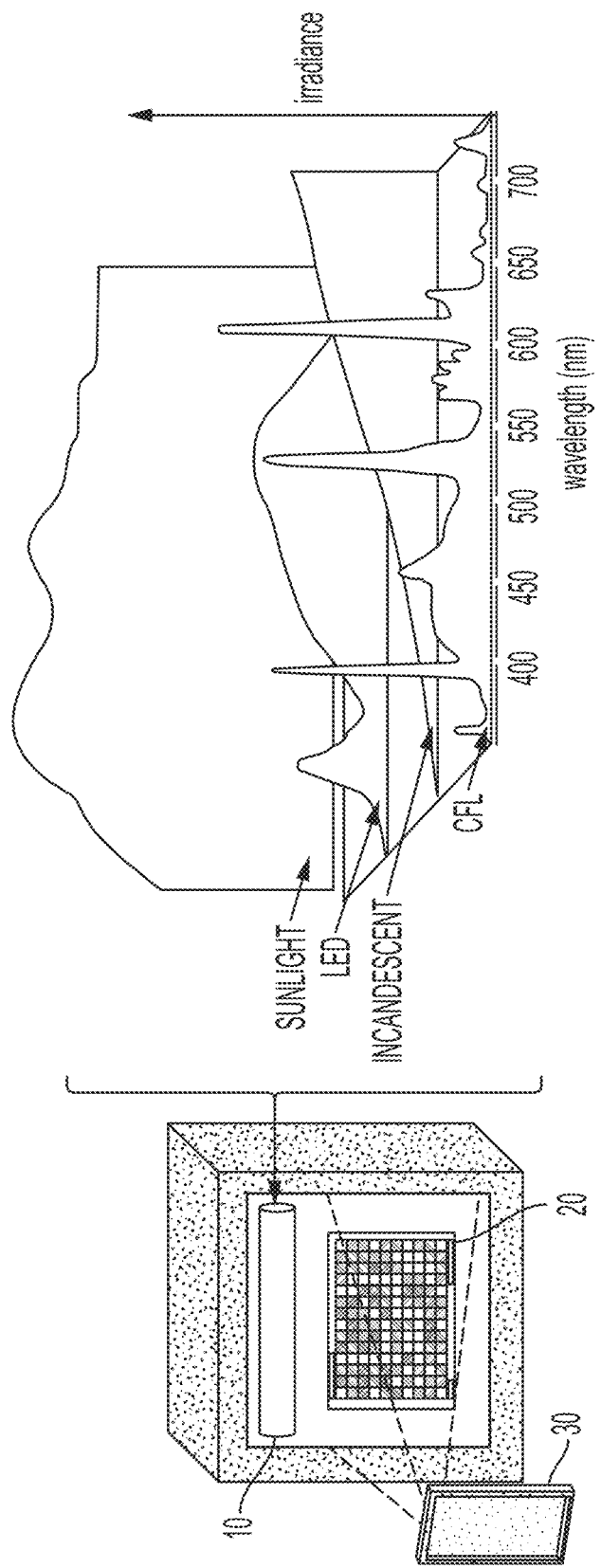
FIG. 3 illustrates a method of collecting an illumination data set for estimating a color transform according to embodiments of the present disclosure.

FIG. 3 illustrates a method of collecting an illumination data set for estimating a color transform according to embodiments of the present disclosure.

As shown in FIG. 3, a light box 10 may be used to illuminate a color chart 20 under different illuminations, such as for example, sunlight (or daylight), light emitting diode (LED) light, incandescent, fluorescent, and the like. Images of the color chart 20 may be captured by a camera sensor 30 under the different illuminations. The images may be used to train a neural network that estimates a color transform. For example, a first color chart image under sunlight, a second color chart image under LED light, a third color charge image under incandescent, and a fourth color chart image under fluorescent may be captured and collected as training data. Once images of the color chart are obtained, ground-truth illuminations may be estimated from the color charts captured in the images, using a neutral patch (also referred to as "achromatic patch" or "gray patch") included in the color charts. The ground-truth illuminations may be stored in the memory 300 to be used in training the first neural network and the second neural network, or to compute color transforms via a linear or non-linear color transform estimation method. In FIG. 3, the color chart is used as a color source for providing diverse colors, but the embodiments of the present disclosure are not limited thereto, and diverse examples of colorful materials may be used instead of the color chart.

Figure 4:
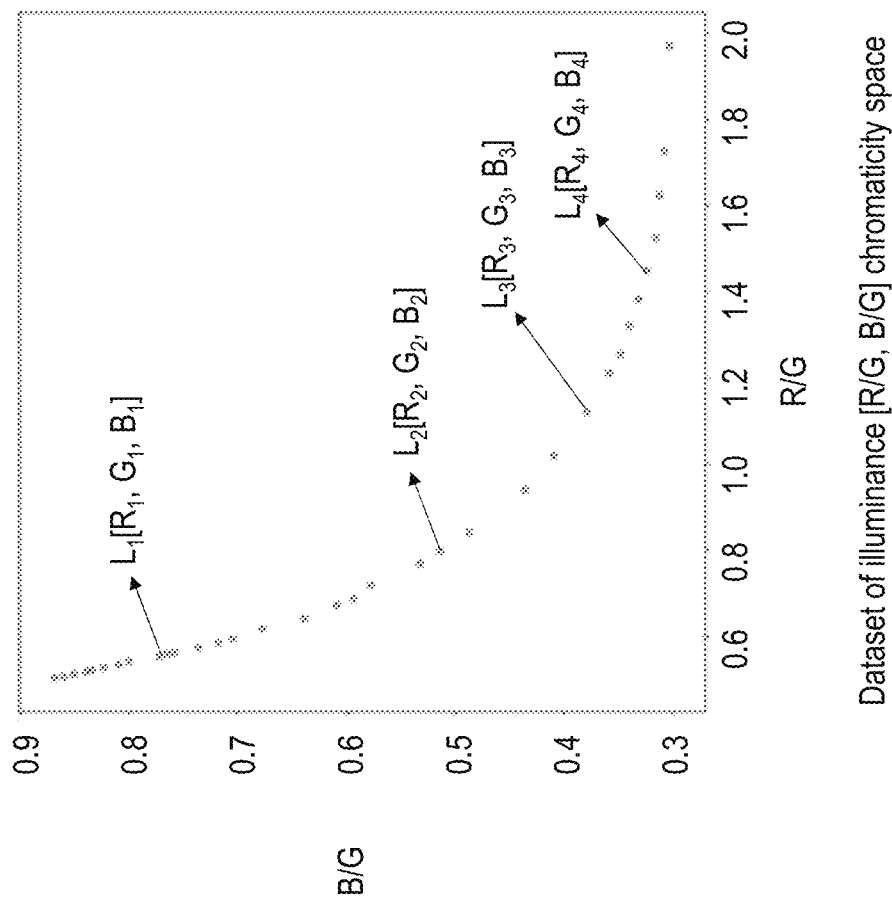
FIG. 4 illustrates a method of indexing images to provide an illumination dataset, according to embodiments of the present disclosure.

FIG. 4 illustrates a method of indexing images to provide an illumination dataset, according to embodiments of the present disclosure. Raw sensor images that are captured under a plurality of different illuminations may be stored and indexed to provide an illumination dataset, and the illumination dataset may include a reference illumination. The raw sensor images that are captured under a plurality of different illuminations may be referred to as color chart images, and the color chart images may be obtained using the light box 10.

As shown in FIG. 4, each of the color chart images is indexed based on a scene illumination using a two-dimensional coordinate [R/G, B/G], and stored as an illumination dataset. For example, a first illumination L1 [R1, G1, B1], a second illumination L2 [R2, G2, B2], a third illumination L3 [R3, G3, B3], and a fourth illumination L4 [R4, G4, B5] may be estimated from an RGB value of a neutral patch included in the first to the fourth color chart images. The first illumination L1 [R1, G1, B1], the second illumination L2 [R2, G2, B2], the third illumination L3 [R3, G3, B3], and the fourth illumination L4 [R4, G4, B5] may be indexed using the two-dimensional coordinate [R/G, B/G], and stored as the illumination dataset.

For each of the color chart images under the different illuminations, two color transforms between corresponding color chart values may be estimated. Specifically, a first color transform that maps an input illumination to a reference illumination, and a second color transform that maps the reference illumination to a target illumination, are estimated. A plurality of pairs of the first color transform and the second color transform may be obtained for the different illuminations, and may be used as a training dataset for training a neural network that estimates a color transform between two arbitrary illuminations. Using this training data set, two color transform estimator models may be trained to predict color transforms corresponding to arbitrary illuminations. Among the two color transform estimator models, a first model may predict a "from-arbitrary-to-reference" transform, and a second model may predict a "from-reference-to-arbitrary" transform. Each of the color transform estimator models may be implemented as a multi-layer perceptron (MLP). A color transform estimation process using an artificial intelligence (AI)-based model will be further described with reference to FIGS. 5, 6A, and 6B.

Alternatively, the indexed illuminations of the color chart images illustrated in FIG. 4 may be used to compute the first color transform and the second color transform based on a mathematical algorithm without using a neural network. A color transform estimation process without using a neural network will be described later with reference to FIGS. 7A, 7B, 8A, and 8B.

Figure 5:
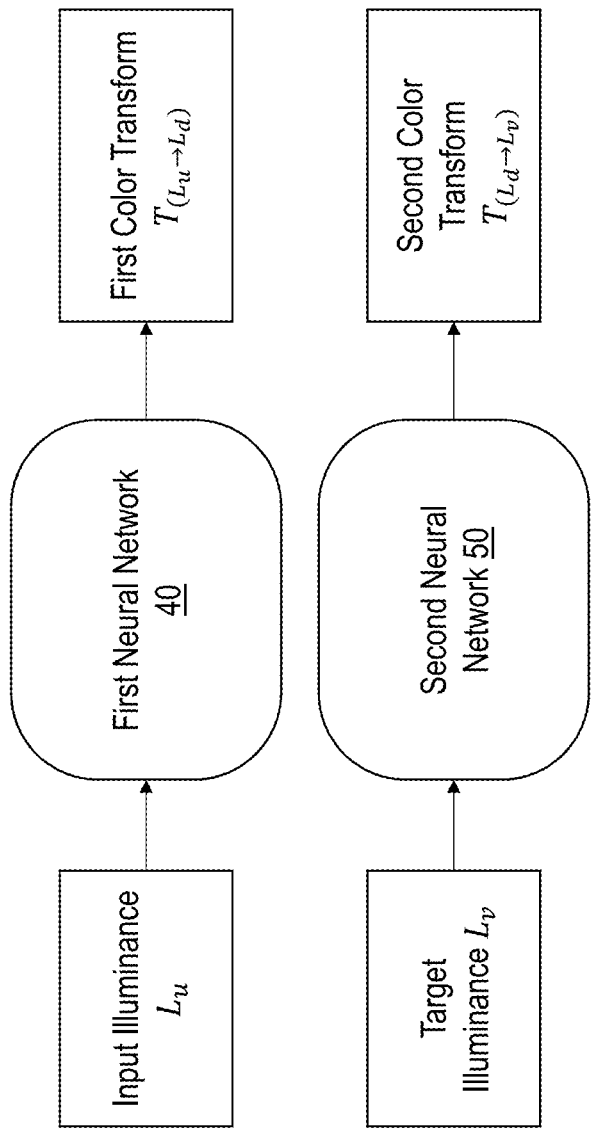
FIG. 5 illustrates a method of training a first neural network and a second neural network, and a method of predicting color transforms using the trained first neural network and the trained second neural network, according to embodiments of the present disclosure.

FIG. 5 illustrates a method of training a first neural network and a second neural network, and a method of predicting color transforms using the trained first neural network and the trained second neural network, according to embodiments of the present disclosure.

Referring to FIG. 5, a first neural network 40 is trained to receive, as input, an input illumination Lu, and output an estimated first color transform that converts the input illumination Lu to a reference illumination Ld. The reference illumination Ld may be a predetermined known value, such as a standard daylight illumination D65. A difference between the estimated first color transform and a ground-truth color transform may be computed as a loss of the first neural network and the loss may be back-propagated to the first neural network 40 to update node weights of the first neural network 40. The ground-truth color transform for the first neural network 40 may be obtained using the above-discussed training dataset. For example, all colors in a color chart that is captured in each of an input image and a reference image may be used to compute the ground-truth color transform $T_{G1}$ for the first neural network 40, or when the input image and the reference image do not capture a color chart, any type of colorful objects or calibration objects in the input image and the reference images may be used to compute the ground-truth color transform $T_{G1}$. In other words, the ground-truth color transform $T_{G1}$ is computed by comparing different RGB values of an object that is observed under different illuminations.

A second neural network 50 is trained to receive, as input, a target illumination Lv, and output an estimated second color transform that converts the reference illumination Ld to the target illumination Lv. A difference between the estimated second color transform and a ground-truth color transform may be computed as a loss of the second neural network 50, and the loss may be back-propagated to the second neural network 50 to update node weights of the second neural network 50. The ground-truth color transform for the second neural network may be obtained using the above-discussed training dataset. All colors in a color chart that is captured in each of the reference image and the target image may be used to compute the ground-truth color transform $T_{G2}$ for the second neural network 50, or when the input image and the reference image do not capture a color chart, any type of colorful objects or calibration objects in the input image and the reference images may be used to compute the ground-truth color transform $T_{G2}$. In other words, the ground-truth color transform $T_{G2}$ is computed by comparing different RGB values of an object that is observed under different illuminations.

Once the first neural network 40 and the second neural network 50 are trained, the first neural network 40 and the second neural network 50 are run at an inference stage. At the inference stage, an input illumination of an input image may be identified using an auto-white-balance (AWB) module, and a target illumination may be identified from a user input. The input illumination is fed into the first neural network 40 to obtain, as output, a first color transform that maps the input illumination to a reference illumination. The target illumination is fed into the second neural network 50 to obtain, as output, a second color transform that maps the reference illumination to the target illumination. The first color transform and the second color transform may be provided as a matrix format (e.g., a 3-by-3 matrix).

Figure 6A:
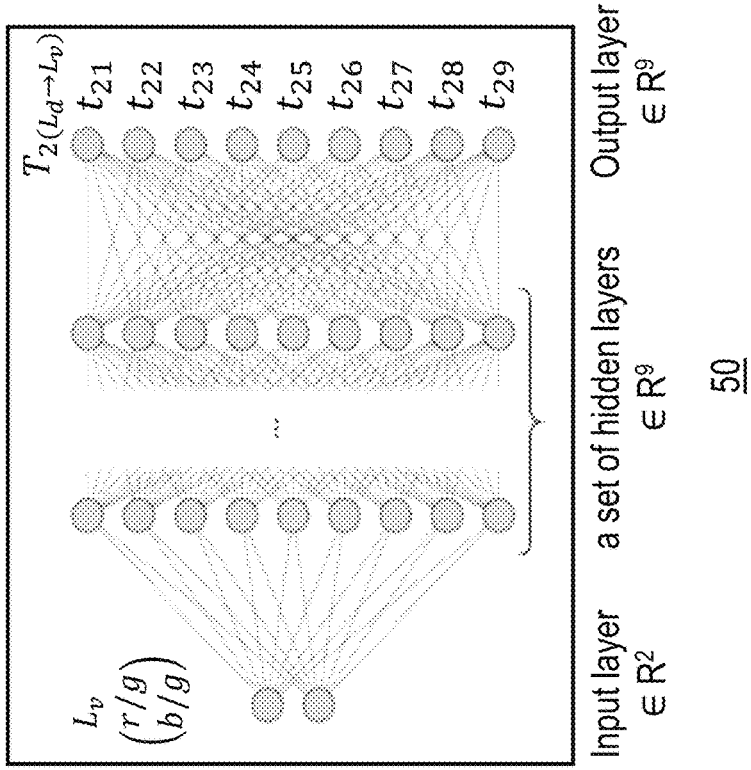
FIGS. 6A and 6B illustrate structures of neural networks configured to estimate color transforms according to embodiments of the present disclosure.
Figure 6B:
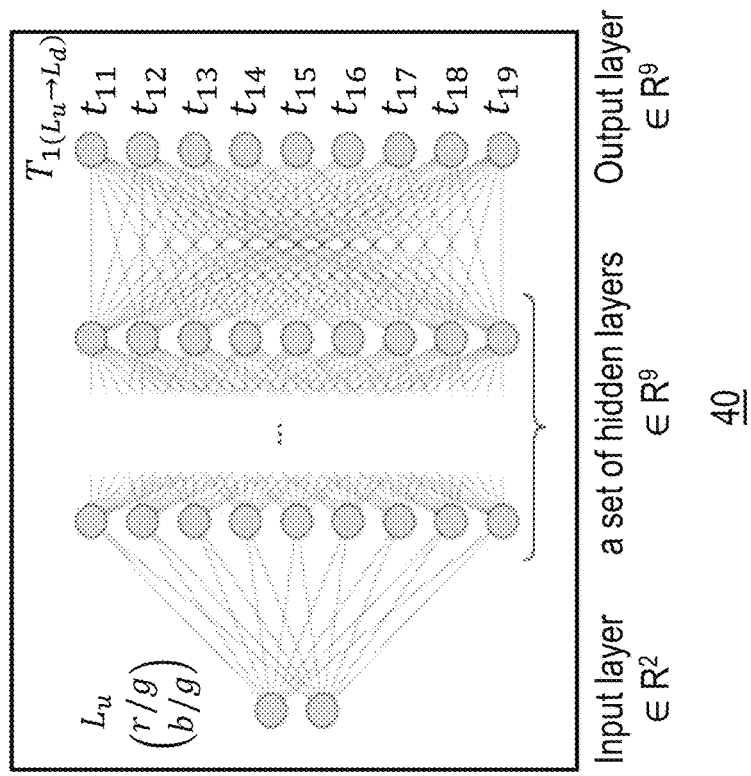

FIGS. 6A and 6B illustrate structures of neural networks configured to estimate color transforms according to embodiments of the present disclosure.

As shown in FIG. 6A, the first neural network 40 may include an input layer, a set of hidden layers, and an output layer. For example, the input layer may include two nodes to receive an input illumination Lu expressed as a two-dimensional coordinate [R/G, B/G]. For example, each of the hidden layers and the output layer may include nine nodes, but the number of the nodes is not limited thereto. The output layer may output a first color transform $T_1$ that converts the input illumination Lu to a reference illumination Ld. In particular, the output layer may output matrix elements ($t_{11}$, $t_{12}$, $t_{13}$, $t_{14}$, $t_{15}$, $t_{16}$, $t_{17}$, $t_{18}$, $t_{19}$) of the first color transform $T_1$, which may be converted into the following matrix:

$$T_1 = \begin{bmatrix} t_{11} & t_{12} & t_{13} \\ t_{14} & t_{15} & t_{16} \\ t_{17} & t_{18} & t_{19} \end{bmatrix}$$

The second neural network 50 may have substantially the same structure as the first neural network 40. For example, as shown in FIG. 6B, the second neural network 50 may include an input layer, a set of hidden layers, and an output layer. For example, the input layer may include two nodes to receive a target illumination Lv expressed as a two-dimensional coordinate [R/G, B/G]. Each of the hidden layers and the output layer may include nine nodes. The output layer may output a second color transform $T_2$ that converts the reference illumination Ld to the target illumination Lv. In particular, the output layer may output matrix elements ($t_{21}$, $t_{22}$, $t_{23}$, $t_{24}$, $t_{25}$, $t_{26}$, $t_{27}$, $t_{28}$, $t_{29}$) of a second color transform $T_2$, which may be converted into the following matrix:

$$T_2 = \begin{bmatrix} t_{21} & t_{22} & t_{23} \\ t_{24} & t_{25} & t_{26} \\ t_{27} & t_{28} & t_{29} \end{bmatrix}$$

As discussed above, the first color transform and the second color transform may be obtained using artificial intelligence (AI)-based models, but the embodiments of the present disclosure are not limited thereto. For example, the first color transform and the second color transform may be computed based on a mathematical algorithm using the illumination dataset collected as shown in FIG. 4.

Figure 7A:
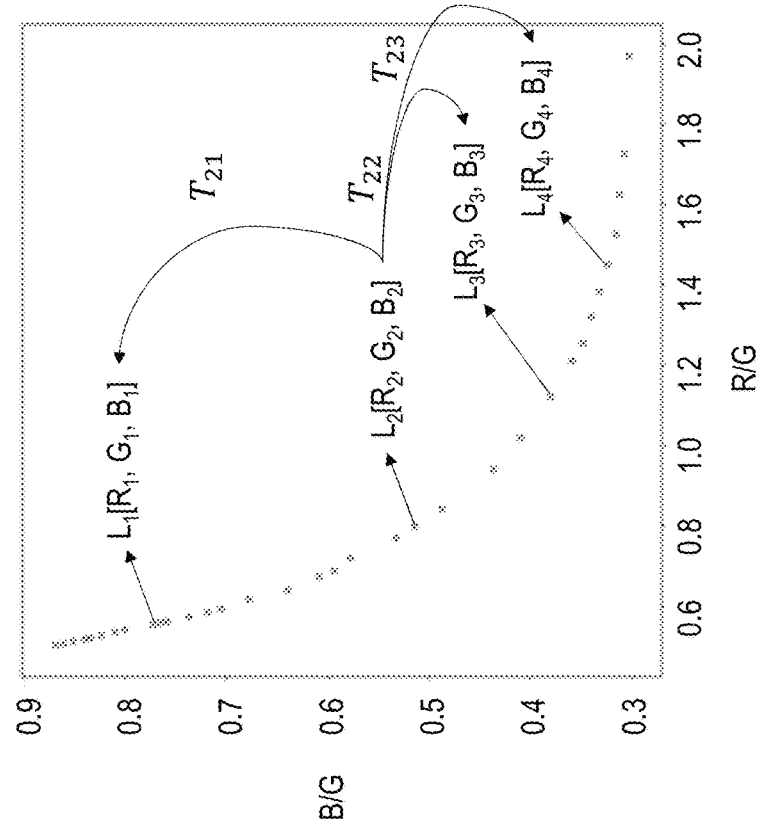
FIG. 7A illustrates a method of obtaining a first color transform that converts an arbitrary input illumination to a reference illumination.
Figure 7B:
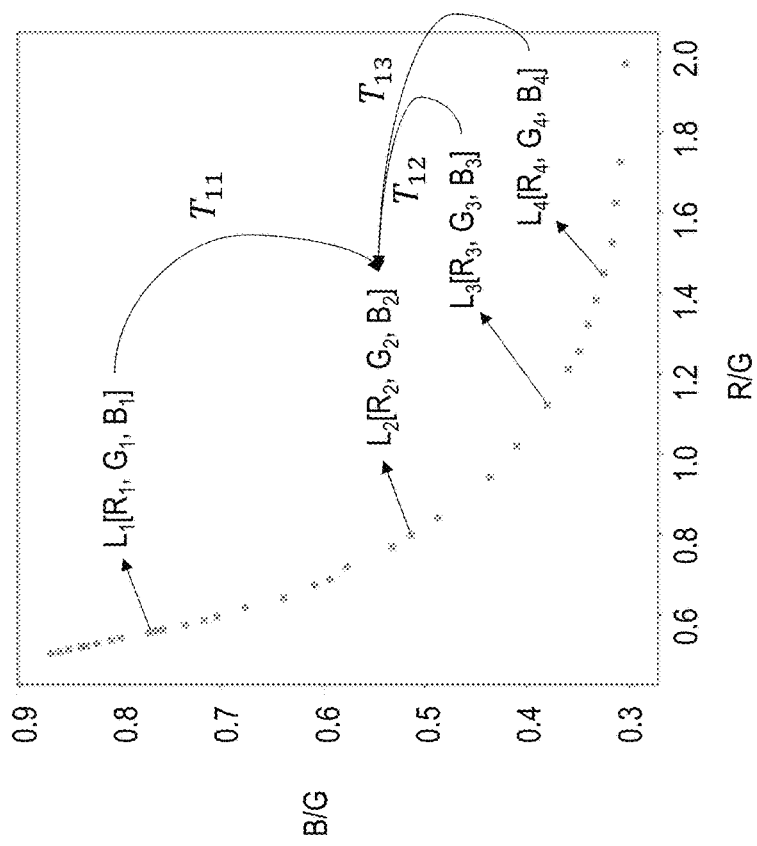
FIG. 7B illustrates a method of obtaining a second color transform that converts a reference illumination to an arbitrary target illumination, according to embodiments of the present disclosure.

FIG. 7A illustrates a method of obtaining a first color transform that converts an arbitrary input illumination to a reference illumination, and FIG. 7B illustrates a method of obtaining a second color transform that converts a reference illumination to an arbitrary target illumination, according to embodiments of the present disclosure. Depending on embodiments of the present disclosure, a linear or non-linear transform estimation method may be used as shown in FIGS. 7A and 7B, in addition to or alternative to a neural-network based transform estimation method as shown in FIGS. 5 and 6.

Referring to FIG. 7A, an illumination dataset including illuminations L1, L2, L3, L4, LN of color chart images may be used to compute a first color transform $T_{11}$, $T_{12}$, $T_{13}$, ... $T_{1N}$ that converts one of the input illuminations L1, L3, L4, ..., LN to a reference illumination L2 where all colors (or a plurality of colors) in the color chart may be used to compute the first color transform. The reference illumination L2 may be a predetermined illumination, such as a standard daylight illumination D65.

Referring to FIG. 7B, the illumination dataset including the illuminations L1, L2, L3, L4, ..., LN of the color chart images may be also used to compute a second color transform $T_{21}$, $T_{22}$, $T_{23}$, ..., $T_{2N}$ that converts the reference illumination L2 to one of the other target illuminations L1, L3, L4, ..., LN, where all colors (or a plurality of colors) in the color chart may be used to compute the second color transform.

The first color transform and the second color transform that are acquired via the methods shown in FIGS. 7A and 7B may be applied to a raw input image example, by the color transformation module 230 of FIG. 1, or may be used as a first ground-truth color transform and a second ground-truth color transform to train the first neural network 40 and the second neural network 50 of the color transformation estimation module 220 of FIG. 1.

Figure 8B:
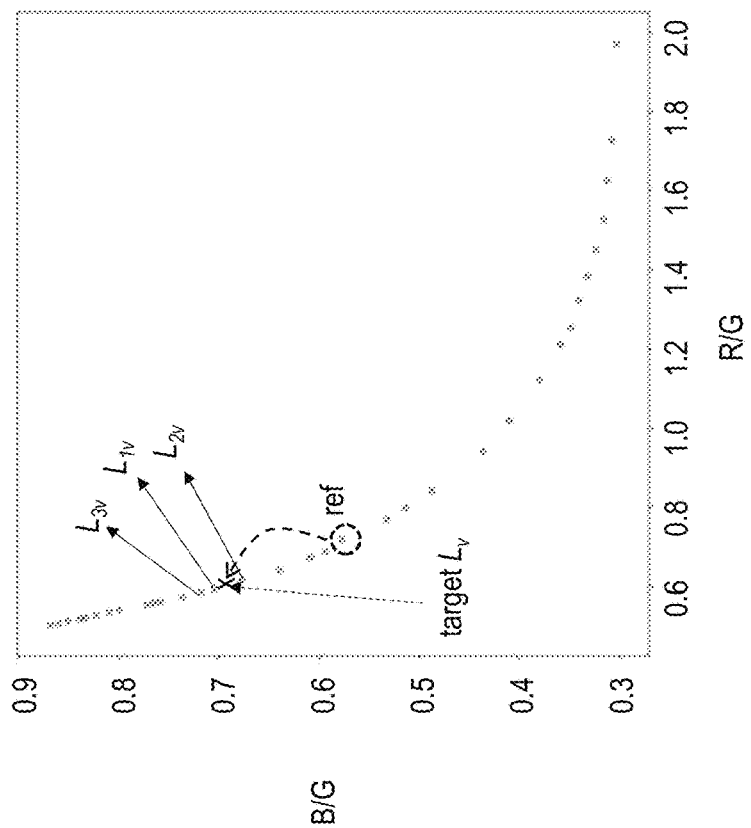
FIG. 8B illustrates a method of obtaining a second color transform that converts a reference illumination to an arbitrary target illumination when the arbitrary target illumination does not exist in an illumination dataset.
Figure 8A:
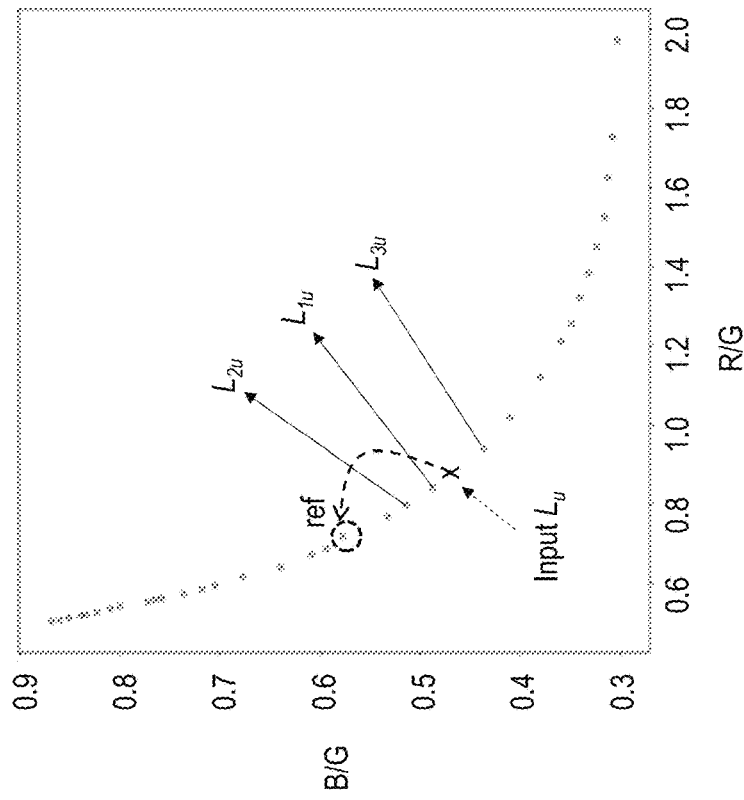
FIG. 8A illustrates a method of obtaining a first color transform that converts an arbitrary input illumination to a reference illumination when the arbitrary input illumination does not exist in an illumination dataset.

FIG. 8A illustrates a method of obtaining a first color transform that converts an arbitrary input illumination to a reference illumination when the arbitrary input illumination does not exist in an illumination dataset, and FIG. 8B illustrates a method of obtaining a second color transform that converts a reference illumination to an arbitrary target illumination when the arbitrary target illumination does not exist in an illumination dataset.

Referring to FIG. 8A, a nearest neighbors interpolation method may be used to select an illumination from an illumination dataset, based on a K-number of illuminations which are nearest to an input illumination $L_u$ in the illumination dataset. For example, when K is set to 3, three illuminations $L_{1u}$, $L_{2u}$, and $L_{3u}$ which are nearest to the input illumination Lu, may be identified from the illumination dataset. Based on the three nearest illuminations $L_{1u}$, $L_{2u}$, and $L_{3u}$, three color transforms $T_{1u}$, $T_{2u}$, and $T_{3u}$ are computed, using a linear or non-linear transform estimation method as shown in FIG. 7A. The three color transforms $T_{1u}$, $T_{2u}$, and $T_{3u}$ may map the nearest illuminations $L_{1u}$, $L_{2u}$, and $L_{3u}$ to a reference illumination $L_d$, respectively.

A first color transform $T(L_u \rightarrow L_d)$ that maps the input illumination $L_u$ to the reference illumination $L_d$ may be computed as a weighted average of the three color transforms $T_{1u}$, $T_{2u}$, and $T_{3u}$ as follows: $T(L_u \rightarrow L_d) = w_{1u}*T_{1u} + w_{2u}*T_{2u} + w_{3u}*T_{3u}$, wherein $w_{1u}$, $w_{2u}$, and $w_{3u}$ are weights having values in a range from 0 to 1.

Referring to FIG. 8B, a nearest neighbors interpolation method may be used to select an illumination from the illumination dataset, based on a K-number of illuminations which are nearest to an output illumination $L_v$ in the illumination dataset. For example, when K is set to 3, three illuminations $L_{1v}$, $L_{2v}$, and $L_{3v}$ which are nearest to the output illumination $L_v$, may be identified from the illumination dataset. Based on the three nearest illuminations $L_{1v}$, $L_{2v}$, and $L_{3v}$, three color transforms $T_{1v}$, $T_{2v}$, and $T_{3v}$ are computed, using a linear or non-linear transform estimation method as shown in FIG. 7B. The three color transforms $T_{1v}$, $T_{2v}$, and $T_{3v}$ may map the reference illumination $L_d$ to the nearest illuminations $L_{1v}$, $Lv_u$, and $L_{3v}$, respectively.

A second color transform $T(L_d \rightarrow L_v)$ that maps the reference illumination $L_d$ to the reference illumination may be computed as a weighted average of the three color transforms $T_{1v}$, $T_{2v}$, and $T_{3v}$ as follows: $T(L_d \rightarrow L_v) = w_{1v}*T_{1v} + w_{2v}*T_{2v} + w_{3v}*T_{3v}$, wherein $w_{1v}$, $w_{2v}$, and $w_{3v}$ are weights having values in a range from 0 to 1.

The first color transform and the second color transform that are acquired via the methods shown in FIGS. 8A and 8B may be applied to an input image, for example, by the color transformation module 230 of FIG. 1, or may be used as a first ground-truth color transform and a second ground-truth color transform to train the first neural network 40 and the second neural network 50 of the color transform estimation module 220 of FIG. 1.

Figure 9:
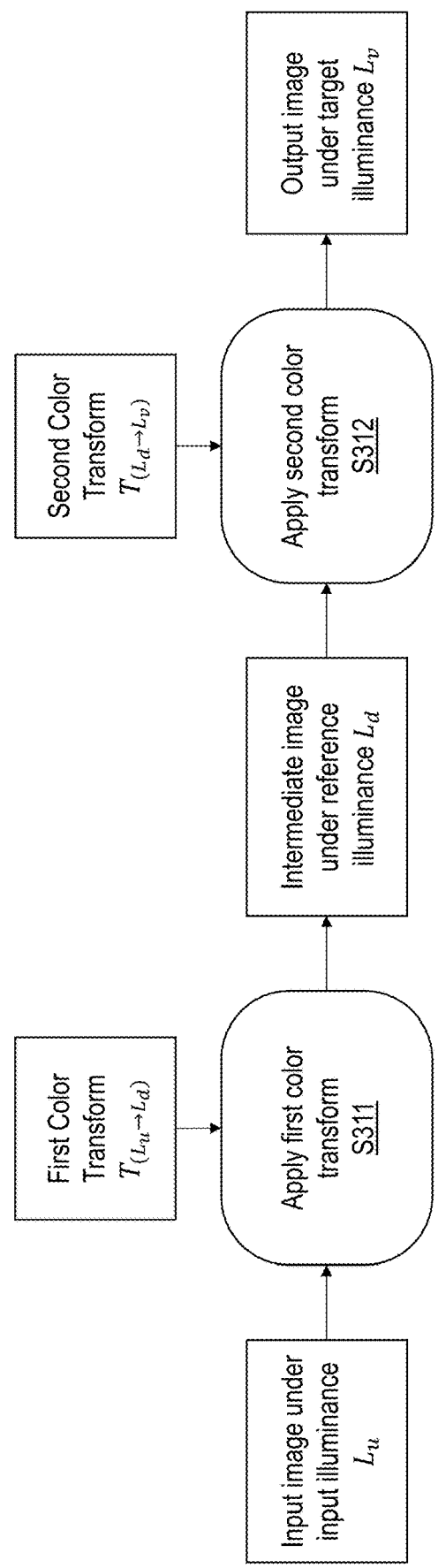
FIG. 9 illustrates a method of applying a first color transform and a second color transform to an input image according to embodiments of the present disclosure.

FIG. 9 illustrates a method of applying a first color transform and a second color transform to an input image according to embodiments of the present disclosure.

Referring to FIG. 9, once a first color transform that maps an input illumination to a reference illumination, and a second color transform that maps the reference illumination to a target illumination are obtained, the first color transform is applied to an input image which is captured under the input illumination in operation S311, to obtain an intermediate image under the reference illumination. In operation S312, the second color transform is applied to the intermediate image to obtain an output image under the target illumination.

Figure 10:
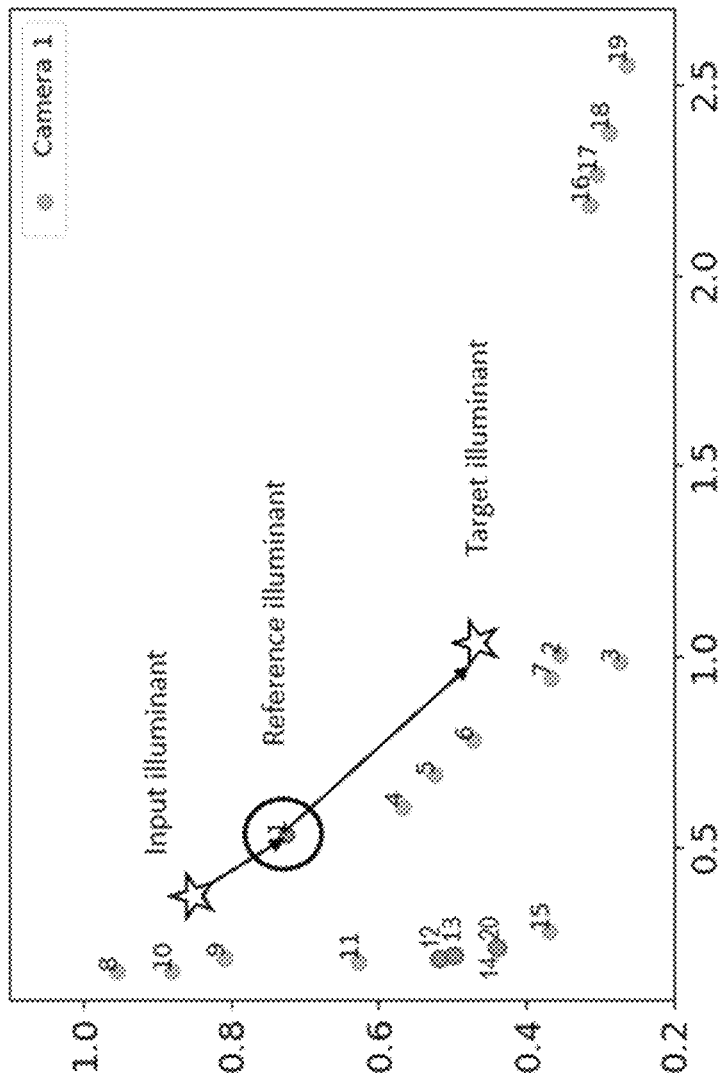
FIG. 10 illustrates a result of converting an input illumination to a reference illumination and converting the reference illumination to a target illumination according to embodiments of the present disclosure.

FIG. 10 illustrates a result of converting an input illumination to a reference illumination and converting the reference illumination to a target illumination according to embodiments of the present disclosure.

As shown in FIG. 10, an arbitrary input illumination is converted into an arbitrary target illumination using a predetermined illumination as a middle proxy between the arbitrary input illumination and the arbitrary target illumination. For example, a standard daylight illumination may be used as the middle proxy to provide accurate color transforms since the daylight illumination has a wide spectral distribution and under which most colors are well represented.

However, embodiments of the present disclosure are not limited to using a middle proxy between an input illumination and a target illumination, and may cover a method of directly mapping an input illumination to a target illumination.

Figure 11:
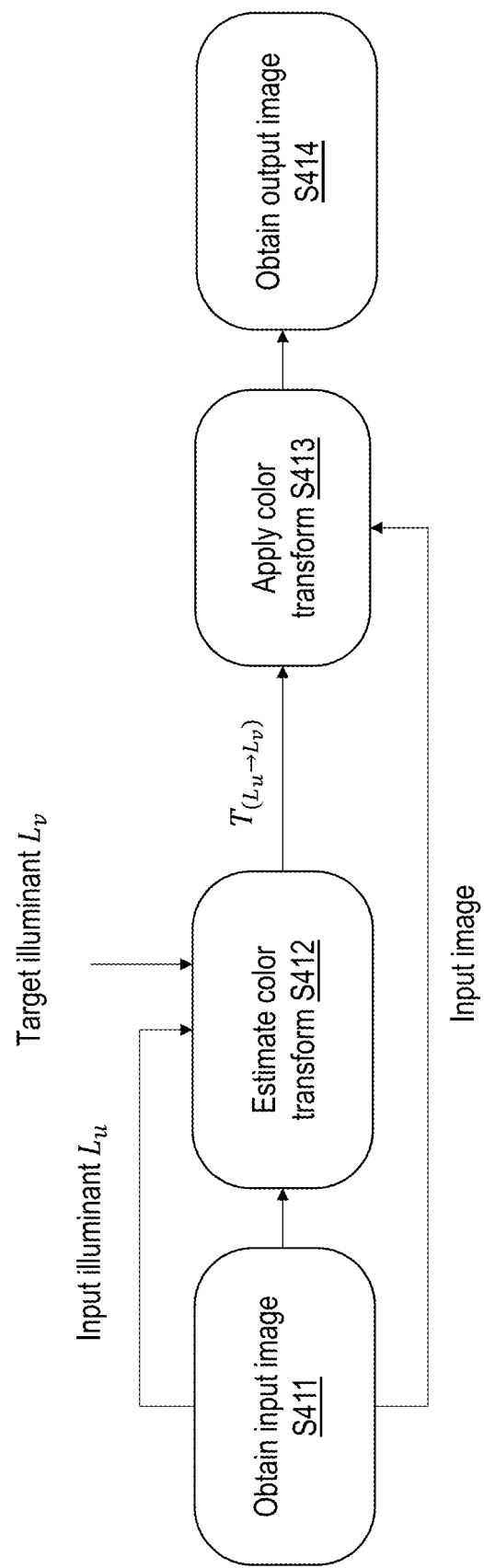
FIG. 11 illustrates a method of converting an input image under an input illumination directly to an output image under a target illumination without using a middle proxy, such as a daylight illumination.

FIG. 11 illustrates a method of converting an input image under an input illumination directly to an output image under a target illumination without using a middle proxy, such as a daylight illumination.

Referring to FIG. 11, in operation S411, an input image is obtained and an input illumination $L_u$ of the input image is identified using an auto-white-balance (AWB) module. In operation S412, a color transform $T(L_u \rightarrow L_v)$ that maps the input image from the input illumination $L_u$ to a target illumination $L_v$ is computed using a linear or non-linear transform estimation method or a neural network-based transform estimation method. The target illumination $L_v$ may be identified from a user input. In operation S413, the color transform is applied to the input image to re-illuminate the input image under the target illumination $L_v$ to obtain an output image under the target illumination $L_v$.

Figure 12:
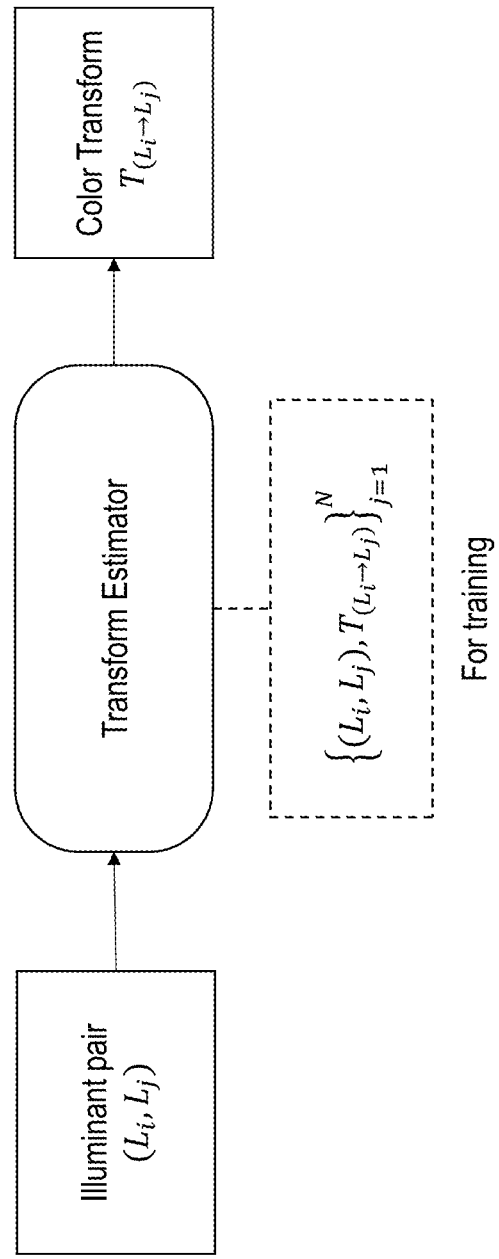
FIG. 12 illustrates a method of training a neural network-based transform estimator according to embodiments of the present disclosure.

FIG. 12 illustrates a method of training a neural network-based transform estimator according to embodiments of the present disclosure.

Referring to FIG. 12, a transform estimator may include at least one neural network which is trained to perform operation S412 of FIG. 11.

The transform estimator may be implemented as a multi-layer perceptron (MLP), and may have a network structure as shown in FIG. 6A or 6B. The transform estimator may receive a pair of an input illumination and a target illumination ($L_i$, $L_j$) as input of the transform estimator, and output an estimated color transform $T(L_i \rightarrow L_j)$. A difference between the estimated color transform and a ground-truth color transform may be computed as a loss of the transform estimator, and the transform estimator may be trained until the loss reaches a predetermined minimum value, or converges into a constant value with a preset margin.

Figure 13:
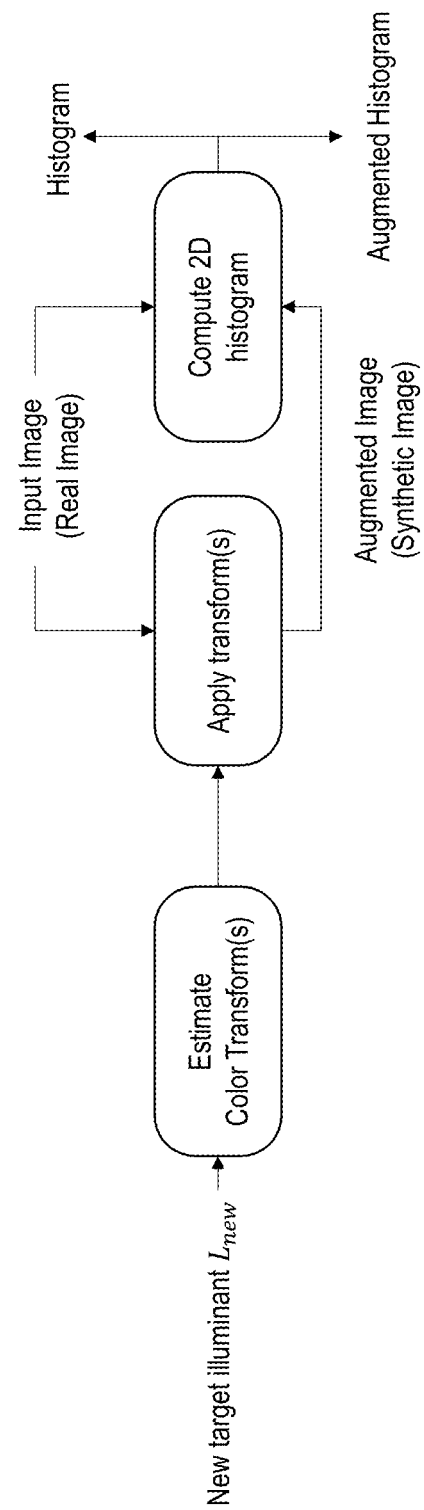
FIG. 13 illustrates a use application of a color transformation method according to embodiments of the present disclosure.

FIG. 13 illustrates a use application of a color transformation method according to embodiments of the present disclosure.

Referring to FIG. 13, once a target illumination is input, at least one color transform that converts an input image from an input illumination to the target illumination is estimated, and the estimated at least one color transform is applied to the input image to generate an augmented image under the target illumination. The input image (and/or the histogram) and the augmented image (and/or the augmented histogram) are stored in an image database, to be used as a training dataset for neural networks.

Figure 14:
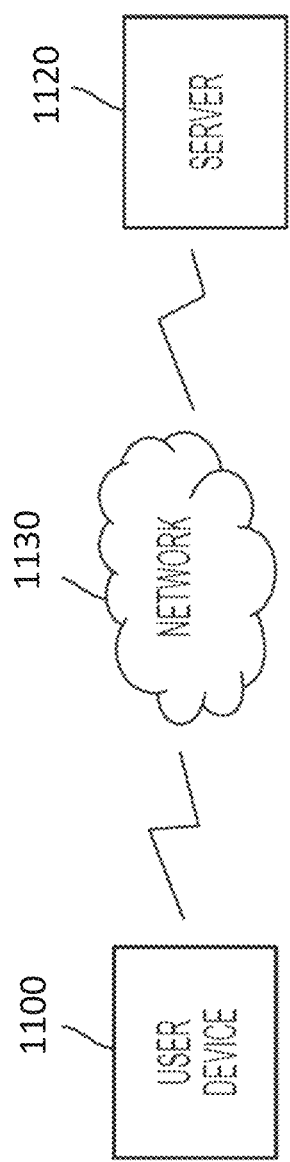
FIG. 14 is a diagram of devices for performing color transformation according to embodiments of the present disclosure.

FIG. 14 is a diagram of devices for performing color transform estimation according to embodiments of the present disclosure. FIG. 14 includes a user device 1100, a server 1120, and a network 1130. The user device 1110 and the server 1120 may interconnect via wired connections, wireless connections, or a combination of wired and wireless connections. An electronic device illustrated in FIG. 1 may correspond to the user device 1100 or a combination of the user device 1100 and the server 1120. For example, all or at least a part of the processor 200 illustrated in FIG. 1 may be included in the server 1120, and the rest of the elements illustrated in FIG. 1 may be included in the user device 1100.

The user device 1100 includes one or more devices configured to generate an output image. For example, the user device 1100 may include a computing device (e.g., a desktop computer, a laptop computer, a tablet computer, a handheld computer, a smart speaker, a server, etc.), a mobile phone (e.g., a smart phone, a radiotelephone, etc.), a camera device (e.g., a camera 100 illustrated in FIG. 1), a wearable device (e.g., a pair of smart glasses or a smart watch), or a similar device.

The server 1120 includes one or more devices configured to receive an image and perform an AI-based image processing on the image to obtain a color-transformed image, according to a request from the user device 1100.

The network 1130 includes one or more wired and/or wireless networks. For example, network 1130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 14 are provided as an example. In practice, there may be additional devices and/or networks, fewer devices and/or networks, different devices and/or networks, or differently arranged devices and/or networks than those shown in FIG. 14. Furthermore, two or more devices shown in FIG. 14 may be implemented within a single device, or a single device shown in FIG. 14 may be implemented as multiple, distributed devices. Additionally, or alternatively, a set of devices (e.g., one or more devices) may perform one or more functions described as being performed by another set of devices.

Figure 15:
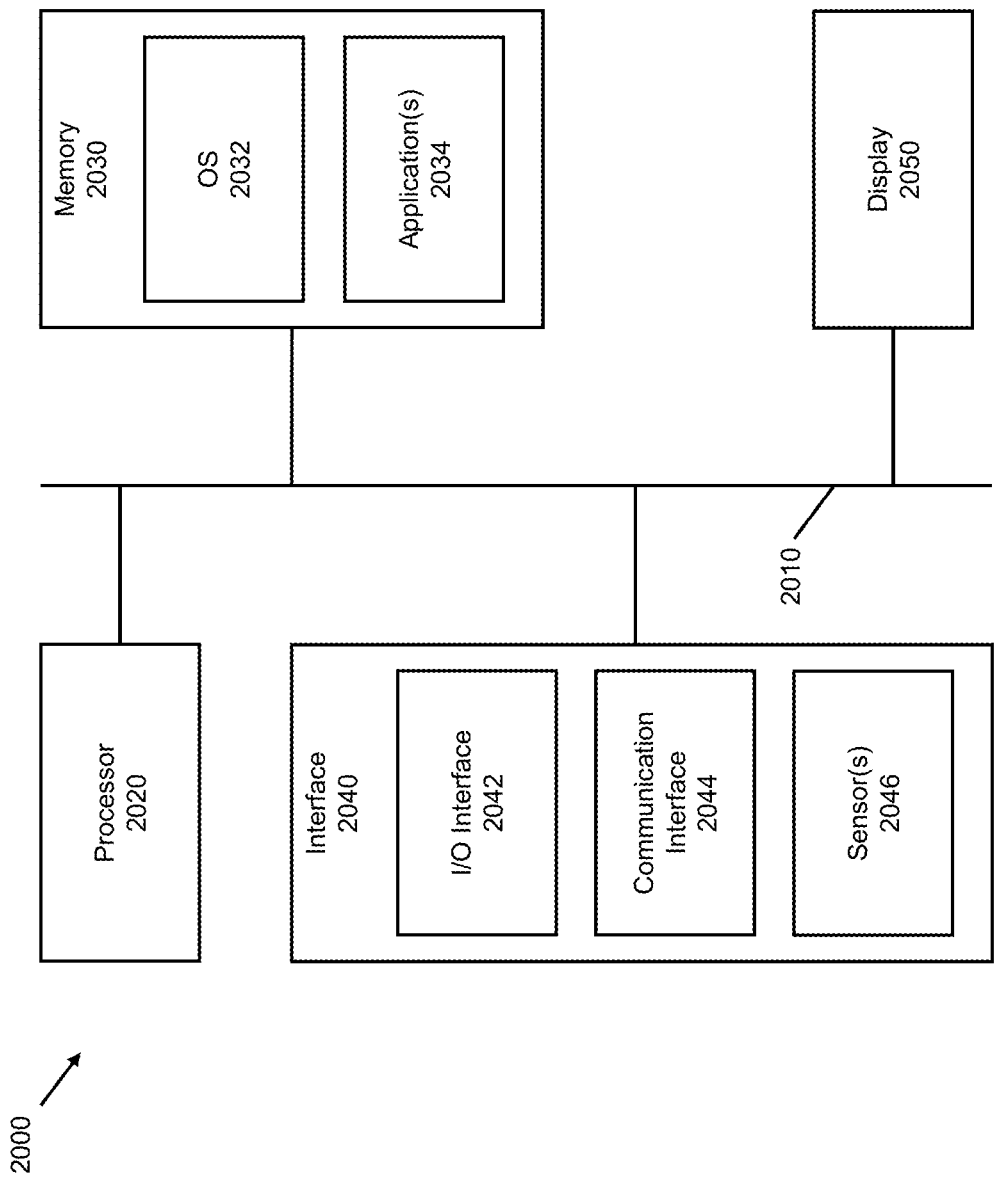
FIG. 15 is a diagram of components of one or more devices of FIG. 14 according to embodiments of the present disclosure.

FIG. 15 is a diagram of components of one or more devices of FIG. 14 according to embodiments of the present disclosure. An electronic device 2000 may correspond to the user device 1100 and/or the server 1120.

The electronic device 2000 includes a bus 2010, a processor 2020, a memory 2030, an interface 2040, and a display 2050.

The bus 2010 includes a circuit for connecting the components 2020 to 2050 with one another. The bus 2010 functions as a communication system for transferring data between the components 2020 to 2050 or between electronic devices.

The processor 2020 includes one or more of a central processing unit (CPU), a graphics processor unit (GPU), an accelerated processing unit (APU), a many integrated core (MIC), a field-programmable gate array (FPGA), a digital signal processor (DSP), a machine learning accelerator, a neural processing unit (NPU). The processor 2020 may be a single core processor or a multi core processor. The processor 2020 is able to perform control of any one or any combination of the other components of the electronic device 2000, and/or perform an operation or data processing relating to communication. For example, the processor 2020 may include all or at least a part of the elements of the processor 200 illustrated in FIG. 1. The processor 2020 executes one or more programs stored in the memory 2030.

The memory 2030 may include a volatile and/or nonvolatile memory. The memory 2030 stores information, such as one or more of commands, data, programs (one or more instructions), applications 2034, etc., which are related to at least one other component of the electronic device 2000 and for driving and controlling the electronic device 2000. For example, commands and/or data may formulate an operating system (OS) 2032. Information stored in the memory 2030 may be executed by the processor 2020. In particular, the memory 2030 may store original images and processed images (e.g., color transformed images).

The applications 2034 include the above-discussed embodiments. In particular, the applications 2034 may include programs to execute the auto-white-balance module 210, the color transform estimation module 220, and the color transformation module 230 of FIG. 1, and to perform operations S211-S217 of FIG. 2. These functions can be performed by a single application or by multiple applications that each carry out one or more of these functions. For example, the applications 2034 may include a photo editing application. When the photo editing application receives a user request to convert colors of an image to colors under a target illumination, the photo editing application may identify an input illumination of the image using an auto-white-balance module, estimate at least one color transform, and apply the at least one color transform to the input image to transform the color of the image to the colors under the target illumination. The photo editing application may display and store the color transformed image.

The display 2050 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 2050 can also be a depth-aware display, such as a multi-focal display. The display 2050 is able to present, for example, various contents, such as text, images, videos, icons, and symbols.

The interface 2040 includes input/output (I/O) interface 2042, communication interface 2044, and/or one or more sensors 2046. The I/O interface 2042 serves as an interface that can, for example, transfer commands and/or data between a user and/or other external devices and other component(s) of the electronic device 2000.

The communication interface 2044 may enable communication between the electronic device 2000 and other external devices, via a wired connection, a wireless connection, or a combination of wired and wireless connections. The communication interface 2044 may permit the electronic device 2000 to receive information from another device and/or provide information to another device. For example, the communication interface 2044 may include an Ethernet interface, an optical interface, a coaxial interface, an infrared interface, a radio frequency (RF) interface, a universal serial bus (USB) interface, a Wi-Fi interface, a cellular network interface, or the like. The communication interface 2044 may receive or transmit a raw image, a processed image, and a target illumination from or to an external device.

The sensor(s) 2046 of the interface 2040 can meter a physical quantity or detect an activation state of the electronic device 2000 and convert metered or detected information into an electrical signal. For example, the sensor(s) 2046 can include one or more cameras (e.g., a camera 100 illustrated in FIG. 1) or other imaging sensors for capturing images of scenes. The sensor(s) 2046 can also include any one or any combination of a microphone, a keyboard, a mouse, and one or more buttons for touch input. The sensor(s) 2046 can further include an inertial measurement unit. In addition, the sensor(s) 2046 can include a control circuit for controlling at least one of the sensors included herein. Any of these sensor(s) 2046 can be located within or coupled to the electronic device 2000.

The color transformation method may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to an electronic device, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The color transformation method may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of a server.

A model related to the neural networks described above may be implemented via a software module. When the model is implemented via a software module (for example, a program module including instructions), the model may be stored in a computer-readable recording medium.

Also, the model may be a part of the electronic device described above by being integrated in a form of a hardware chip. For example, the model may be manufactured in a form of a dedicated hardware chip for artificial intelligence, or may be manufactured as a part of an existing general-purpose processor (for example, a CPU or application processor) or a graphic-dedicated processor (for example a GPU).

While the embodiments of the disclosure have been described with reference to the figures, it will be understood by those of ordinary skill in the art that various changes in form and details may be made therein without departing from the spirit and scope as defined by the following claims.

What is claimed is:

1. An electronic device for processing image data, the electronic device comprising:
  a user interface configured to receive a target illumination;
  at least memory storing instructions and configured to store an illumination dataset of raw sensor images that are captured under a plurality of different illuminations including a reference illumination; and
  at least one processor configured to execute the instructions to:
    obtain a raw input image that is captured under an input illumination;
    obtain an intermediate image having colors captured under the reference illumination, from the raw input image, based on a first color transform that maps the input illumination to the reference illumination in the illumination dataset; and
    obtain an output image having colors captured under the target illumination, from the intermediate image, based on a second color transform that maps the reference illumination in the illumination dataset, to the target illumination.

2. The electronic device of claim 1, wherein the at least one processor is further configured to perform illumination estimation based on the raw input image transformed by the first color transform and the second color transform, via an auto-white balance module.

3. The electronic device of claim 1, wherein the at least one processor is further configured to create an augmented data set including the output image, and input the augmented data set to an artificial intelligence (AI)-based image processing model to train the AI-based image processing model.

4. The electronic device of claim 1, wherein the raw sensor images and the raw input image are unprocessed Bayer images or images which are not corrected via an image signal processor (ISP).

5. The electronic device of claim 1, wherein the first color transform and the second color transform are represented as a first transformation matrix and a second transformation matrix, respectively, and
  wherein the at least one processor is further configured to:
    obtain the first color transform via a first neural network configured to receive a ratio of RGB values of the input illumination and output elements of the first transformation matrix; and
    obtain the second color transform via a second neural network configured to receive a ratio of RGB values of the target illumination and output elements of the second transformation matrix.

6. The electronic device of claim 5, wherein the first neural network and the second neural network are trained using a training input illumination, a training target illumination, and the reference illumination that are obtained from the illumination dataset, and
wherein the training input illumination, the training target illumination, and the reference illumination are obtained from an achromatic patch in a color rendition chart of the raw sensor images.

7. The electronic device of claim 1, wherein the at least one processor is further configured to:
based on the illumination dataset not including the input illumination, identify a K number of illuminations that are nearest to the input illumination in the illumination dataset, and use a weighted sum of color transforms of the K number of illuminations as the first color transform, and
wherein K denotes a natural number that is greater than or equal to 2.

8. The electronic device of claim 1, wherein the at least one processor is further configured to:
based on the illumination dataset not including the target illumination, identify a K number of illuminations that are nearest to the target illumination in the illumination dataset, and use a weighted sum of color transforms of the K number of illuminations as the second color transform, and
wherein K denotes a natural number that is greater than or equal to 2.

9. The electronic device of claim 1, further comprising:
a camera configured to capture the raw input image; and
a display,
wherein the user interface is further configured to receive, as a user input, the target illumination and a request for creating a synthesized image of the raw input image, and
wherein the at least one processor is further configured to control the display to display the output image as the synthesized image of the raw input image that is re-illuminated under the target illumination.

10. A method for processing image data, the method comprising:
obtaining a raw input image that is captured under an input illumination;
obtaining a target illumination from a user input;
obtaining an intermediate image having colors captured under a reference illumination, from the raw input image, based on a first color transform that maps the input illumination to the reference illumination in an illumination dataset of raw sensor images that are captured under a plurality of different illuminations; and
obtaining an output image having colors captured under the target illumination, from the intermediate image, based on a second color transform that maps the reference illumination in the illumination dataset to the target illumination.

11. The method of claim 10, further comprising:
performing illumination estimation on the raw input image transformed by the first color transform and the second color transform via an auto-white balance module.

12. The method of claim 10, further comprising:
creating an augmented data set including the output image, and input the augmented data set to an artificial intelligence (AI)-based image processing model to train the AI-based image processing model.

13. The method of claim 10, wherein the raw input image is an unprocessed Bayer image or an image which is not corrected via an image signal processor (ISP).

14. The method of claim 10, wherein the first color transform and the second color transform are represented as a first transformation matrix and a second transformation matrix, respectively, and
wherein the method further comprises:
obtaining the first color transform via a first neural network configured to receive a ratio of RGB values of the input illumination and output elements of the first transformation matrix; and
obtaining the second color transform via a second neural network configured to receive a ratio of RGB values of the target illumination and output elements of the second transformation matrix.

15. The method of claim 14, further comprising:
training the first neural network using a training input illumination and the reference illumination; and
training the second neural network using the reference illumination and a training target illumination,
wherein the training input illumination, the training target illumination, and the reference illumination are obtained from the illumination dataset.

16. The method of claim 10, further comprising:
based on the illumination dataset not including the input illumination, identifying a K number of illuminations that are nearest to the input illumination in the illumination dataset, and using a weighted sum of color transforms of the K number of illuminations as the first color transform,
wherein K denotes a natural number that is greater than or equal to 2.

17. The method of claim 10, further comprising:
based on the illumination dataset not including the target illumination, identifying a K number of illuminations that are nearest to the target illumination in the illumination dataset, and using a weighted sum of color transforms of the K number of illuminations as the second color transform,
wherein K denotes a natural number that is greater than or equal to 2.

18. A non-transitory computer-readable storage medium storing a program that is executable by at least one processor to perform a method for processing image data, the method comprising:
obtaining a raw input image that is captured under an input illumination;
obtaining a target illumination from a user input;
obtaining an intermediate image having colors captured under a reference illumination, from the raw input image, based on a first color transform that maps the input illumination to the reference illumination in an illumination dataset of raw sensor images that are captured under a plurality of different illuminations; and
obtaining an output image having colors captured under the target illumination, from the intermediate image, based on a second color transform that maps the reference illumination in the illumination dataset to the target illumination.

19. The non-transitory computer-readable storage medium of claim 18, wherein the method further comprises:
obtaining the first color transform via a first neural network configured to receive a ratio of RGB values of the input illumination and output elements of a first transformation matrix that represents the first color transform; and obtaining the second color transform via a second neural network configured to receive a ratio of RGB values of the target illumination and output elements of a second transformation matrix that represents the second color transform.

20. The non-transitory computer-readable storage medium of claim 18, wherein the method further comprises:

based on the illumination dataset not including the input illumination, identify a K number of first illuminations that are nearest to the input illumination in the illumination dataset, and use a weighted sum of color transforms of the K number of first illuminations as the first color transform; and based on the illumination dataset not including the target illumination, identify a K number of second illuminations that are nearest to the target illumination in the illumination dataset, and use a weighted sum of color transforms of the K number of second illuminations as the second color transform, wherein K denotes a natural number that is greater than or equal to 2.

* * * * *